Feb. 18, 1936. W. G. YOUNG ET AL 2,031,294
EGG BREAKING AND SEPARATING MACHINE
Filed May 2, 1930 11 Sheets-Sheet 4

Feb. 18, 1936.   W. G. YOUNG ET AL   2,031,294
EGG BREAKING AND SEPARATING MACHINE
Filed May 2, 1930   11 Sheets-Sheet 7

Inventors
William G. Young
Morton Hansen
Joseph F. Pollon
By Lyon & Lyon
Attorneys Feb. 18, 1936.  W. G. YOUNG ET AL  2,031,294

EGG BREAKING AND SEPARATING MACHINE

Filed May 2, 1930  11 Sheets-Sheet 8

Inventors
William G. Young
Morton Hansen
Joseph F. Pollon
By Lyon & Lyon
Attorneys Feb. 18, 1936. W. G. YOUNG ET AL 2,031,294
EGG BREAKING AND SEPARATING MACHINE
Filed May 2, 1930 11 Sheets-Sheet 9
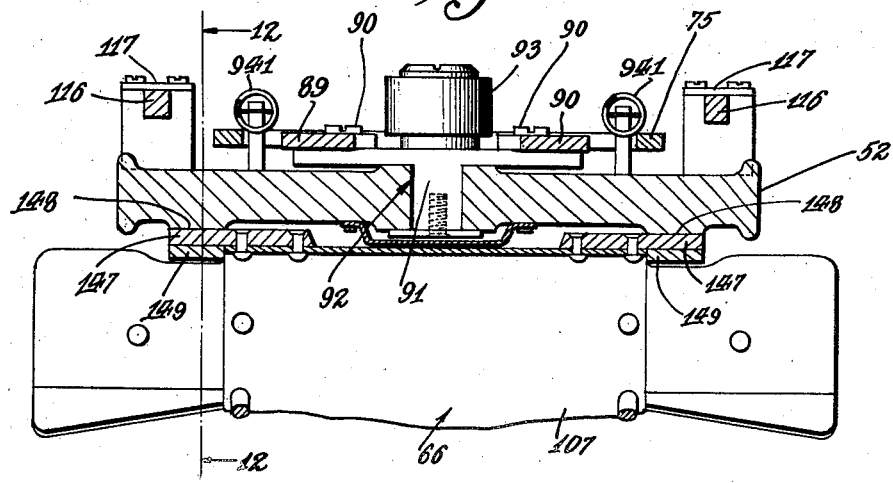
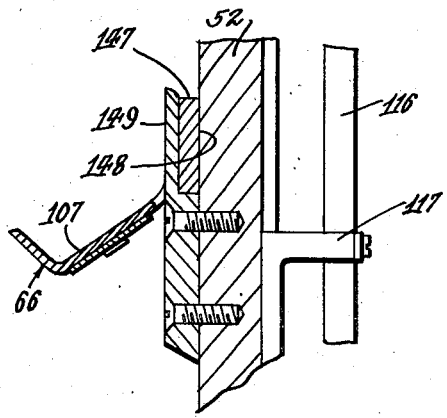
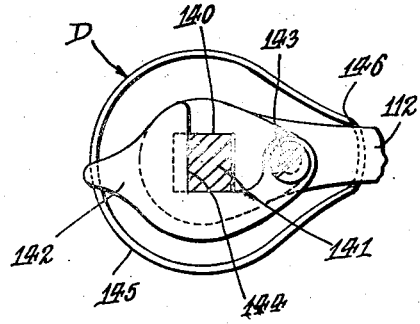

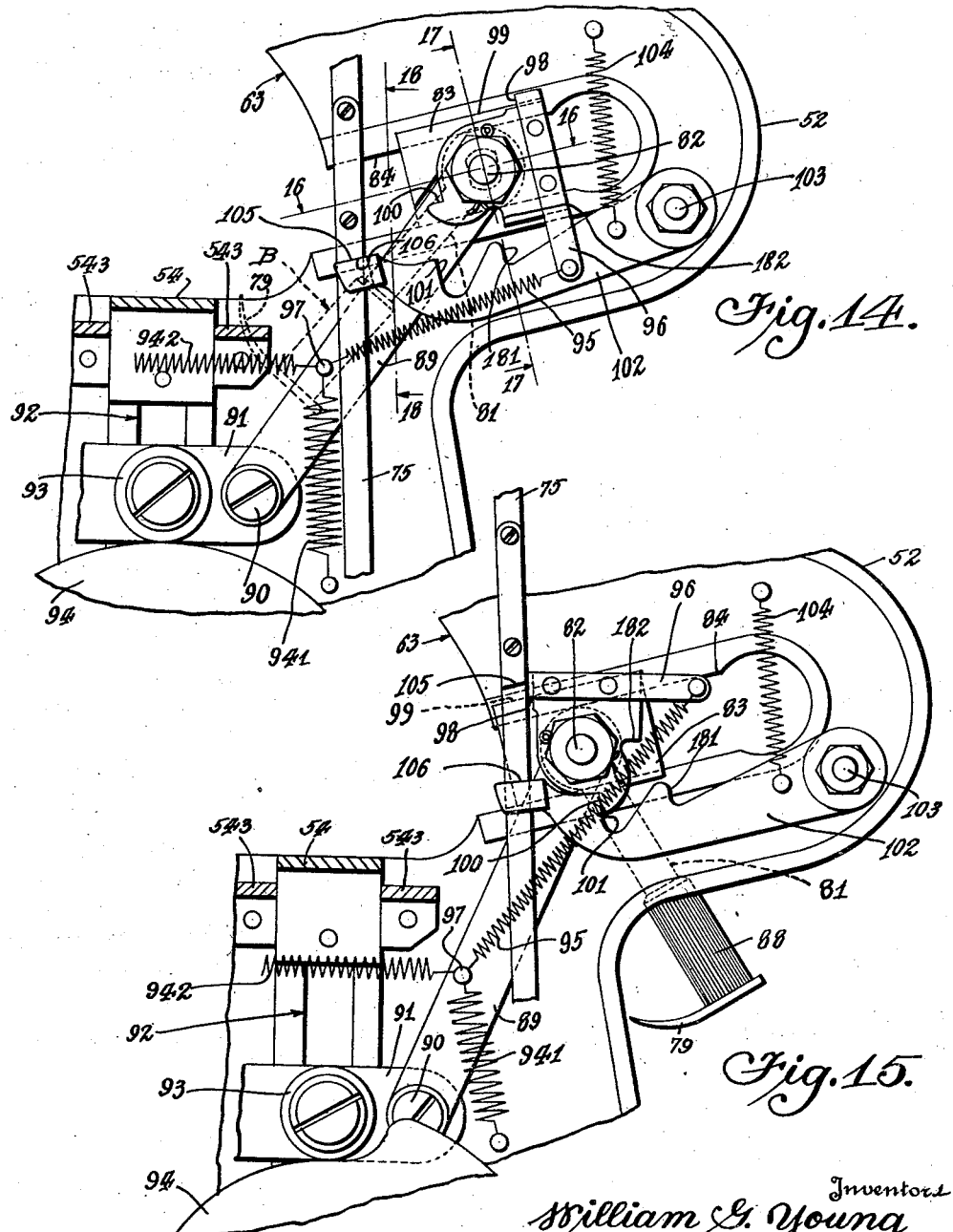

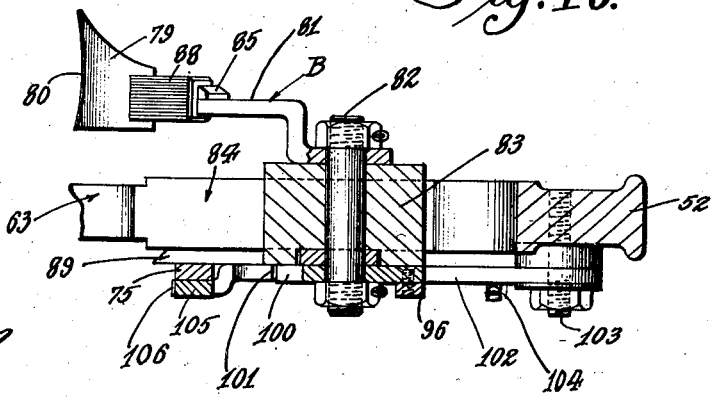

Patented Feb. 18, 1936

2,031,294

UNITED STATES PATENT OFFICE 2,031,294

EGG BREAKING AND SEPARATING MACHINE

William G. Young and Morton Hansen, Los Angeles, and Joseph F. Pollon, Glendale, Calif.; said Pollon assignor to said Young and said Hansen Application May 2, 1930, Serial No. 449,240

32 Claims. (Cl. 146—2)

This invention relates to egg breaking and separating machines, and an object, in general, is to improve the construction of machines of this type.

Another important object is to provide for perfectly automatic operation in feeding the eggs to the breaking mechanism, operation of said breaking means, ejection of the egg shells from the breaking mechanism, and separation of the whites and yolks.

Another important object is to provide a feeding mechanism for the egg that will effect turning of the egg into proper position so that the breaking elements will extend transversely of the egg shell.

Another important object is to effect picking up of the eggs from the end of a feed chute and lifting the eggs, one at a time, onto an egg separating arm along which the eggs are rolled by the lifting arm.

Another important object is to provide a construction of which the parts with which the egg yolks and whites come in contact may be readily detached and cleansed.

Another important object is to effect pulling apart of the halves of a broken egg shell by the cracking elements so as to facilitate the contents of the shell flowing out of said shell.

Other objects and advantages will appear in the subjoined detailed description.

In the drawings:

Figure 1 is a front elevation of an egg breaking and separating machine constructed in accordance with the provisions of this invention, the various moving parts being shown in solid lines in the positions they occupy at the moment that the cracking elements penetrate the egg. Dotted lines indicate parts of the cracking mechanism in the positions they occupy after the cracking elements have opened the egg shell.

Figure 3:
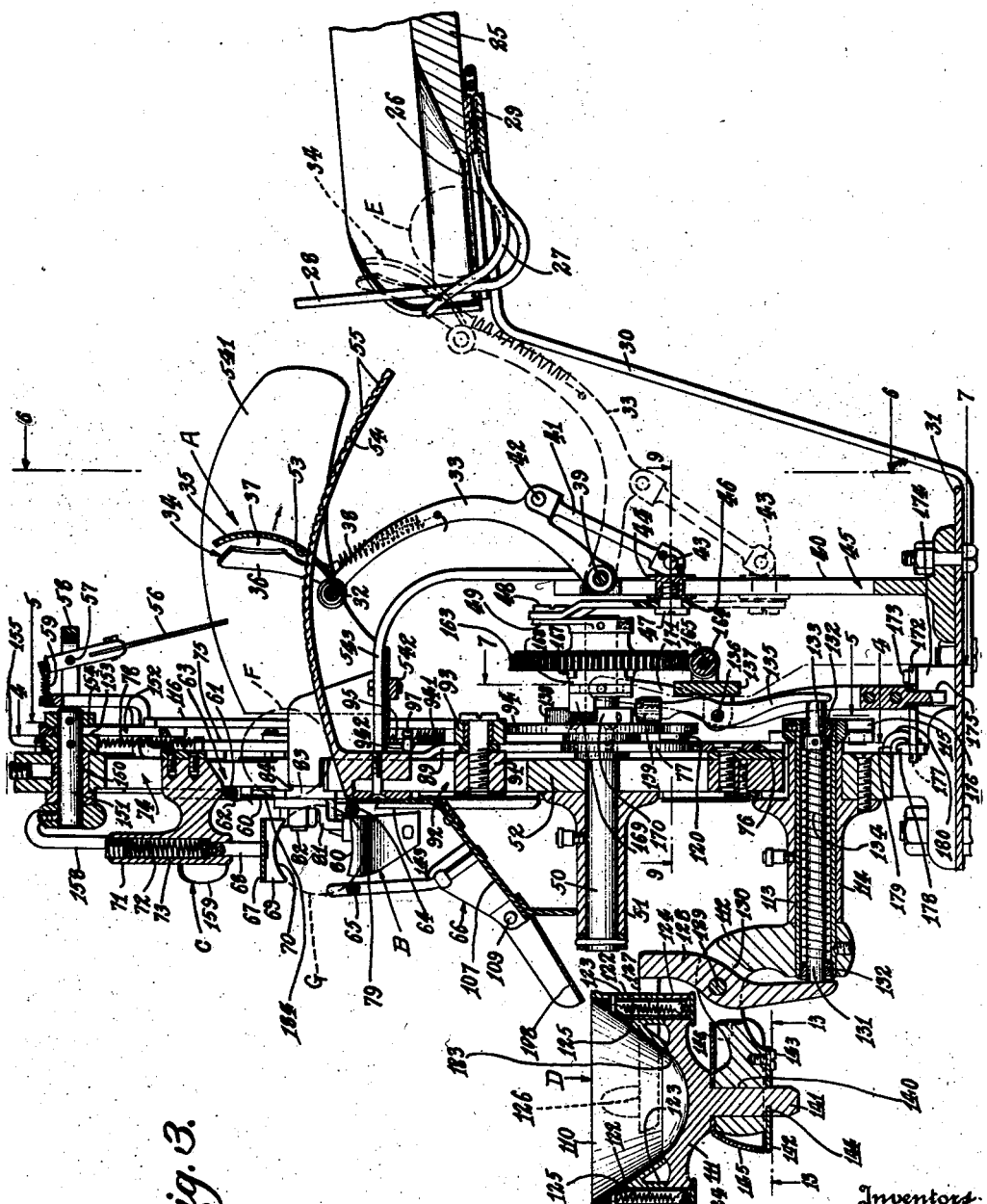
Fig. 3 is a vertical section on the line indicated by 3—3, Fig. 1, a fragment of the feed chute being shown in section. The feed mechanism is shown in two different positions in solid and broken lines.
Figure 5:
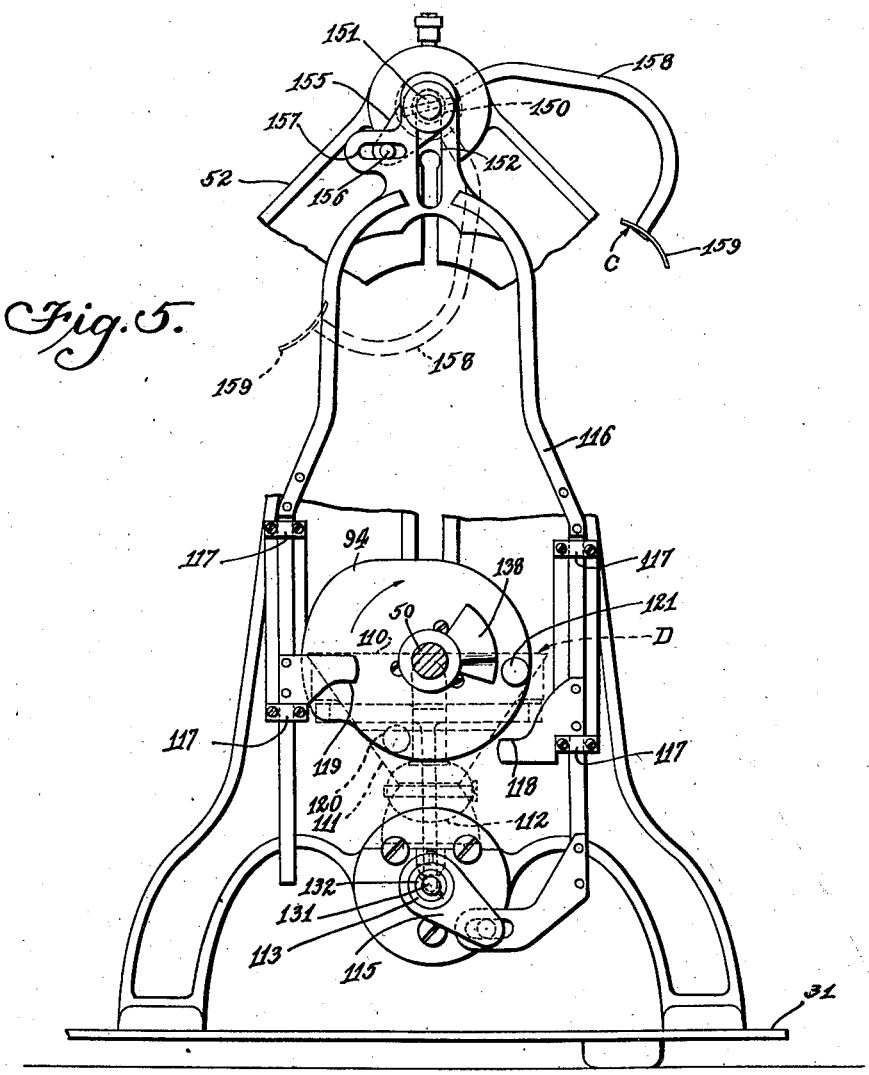

Fig. 5 is an elevation approximately from the line indicated by 5—5, Fig. 3, the main drive shaft being shown in section. Only the mechanisms for ejecting the egg shell and tilting the egg separating elements are shown in this view. Two positions of the egg ejecting arms are illustrated in solid and broken lines.

Figure 6:
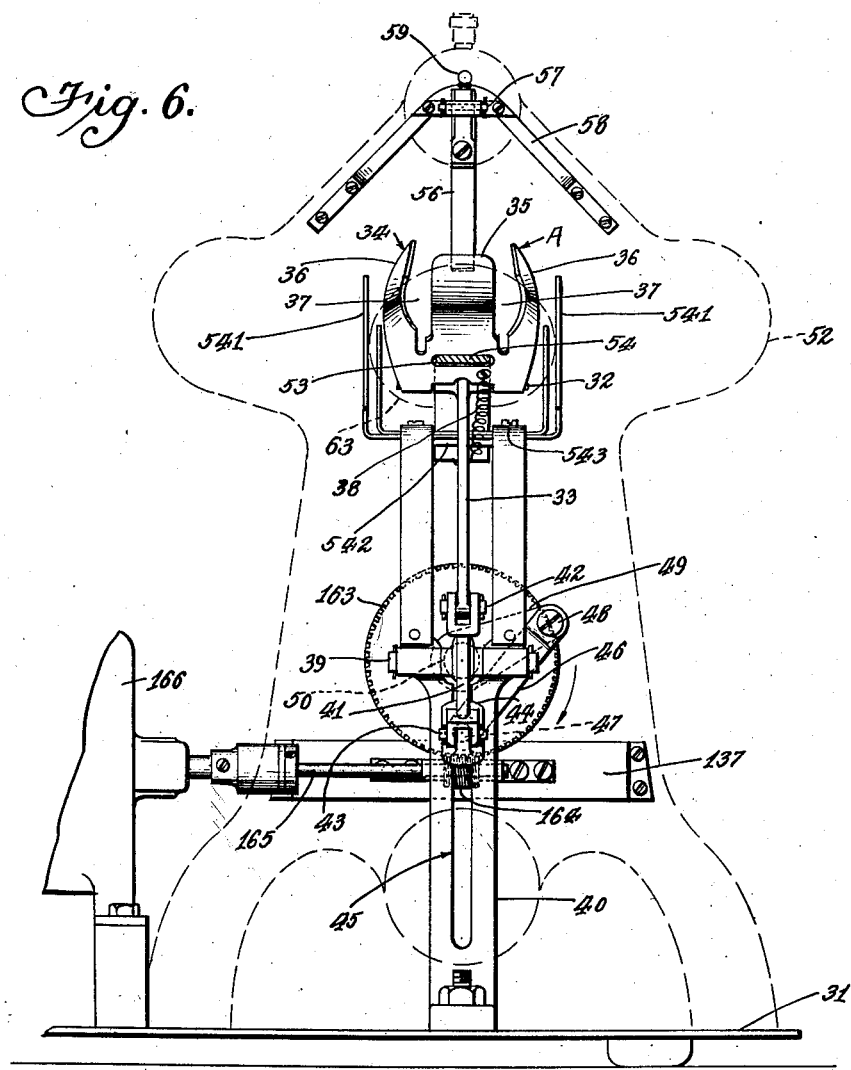

Fig. 6 is an elevation from the line indicated by 6—6, Fig. 3, showing only the egg feeding mechanism and the main drive, the motor being fragmentarily shown. The frame is indicated in broken lines and the egg supporting arm is shown in section.

Figure 7:
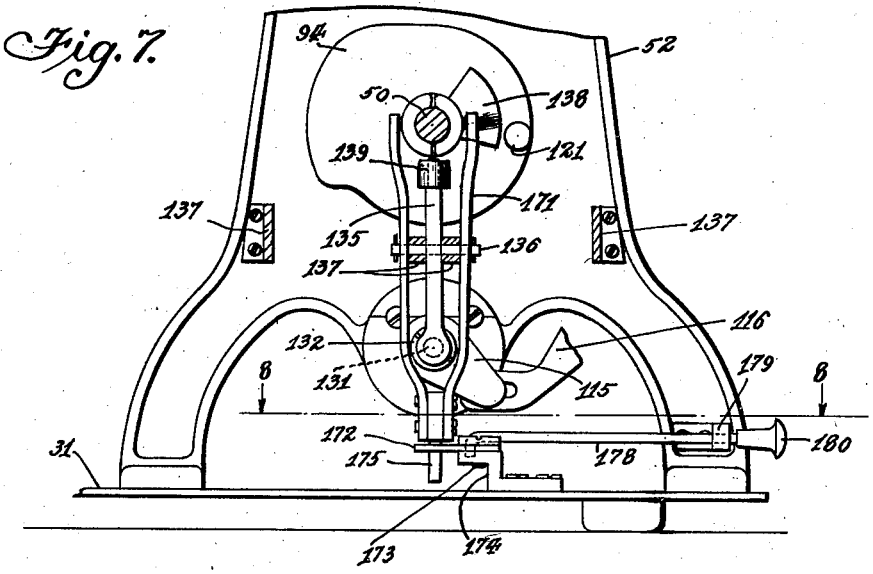

Fig. 7 is a fragmental elevation, partly in section, from the irregular line indicated by 7—7, Fig. 3. The clutch and the mechanism for effecting raising of the upper cup section are above illustrated.

Figure 8:
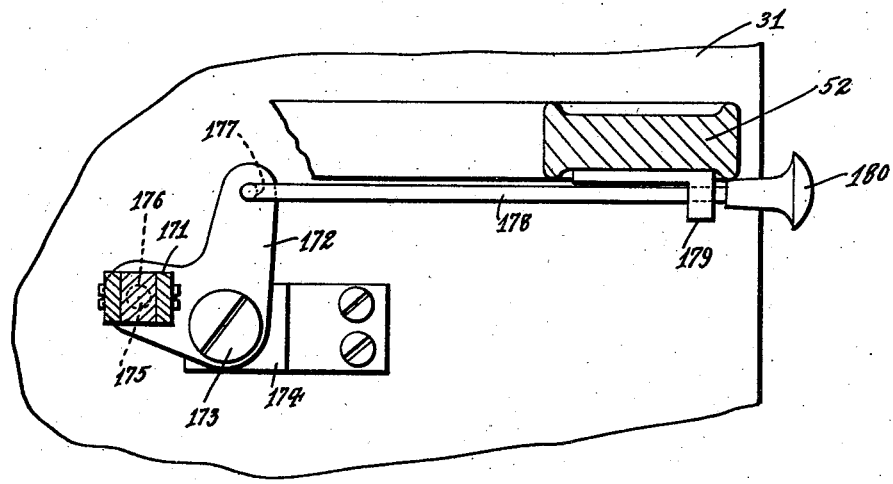

Fig. 8 is an enlarged fragmental horizontal view, partly in section, on the line indicated by 8—8, Fig. 7, showing details of the clutch operating device.

Figure 9:
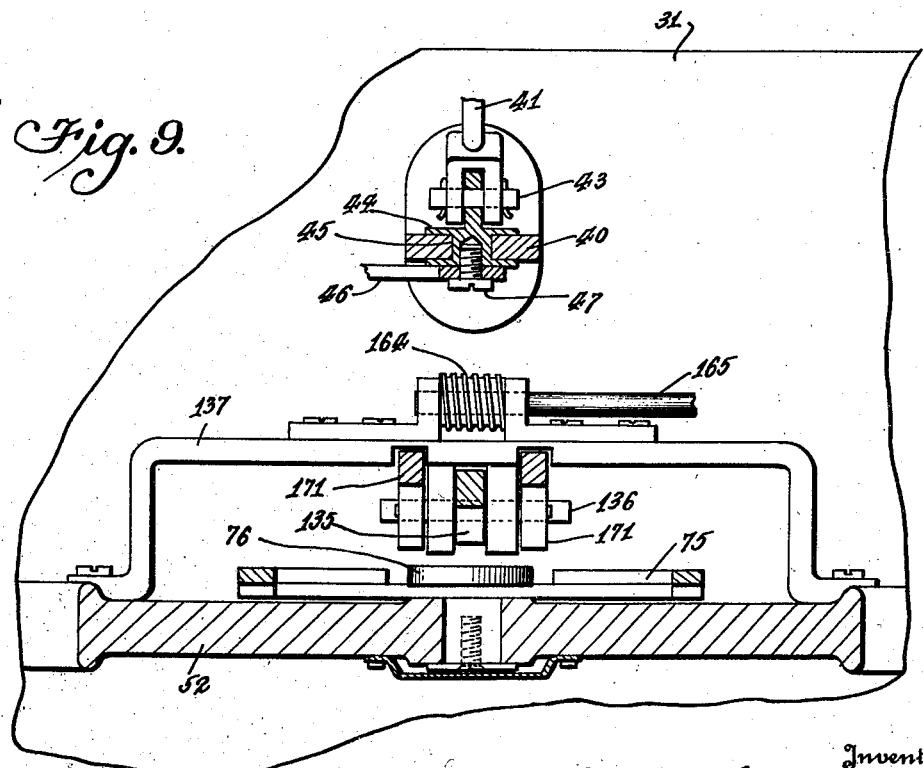

Fig. 9 is an enlarged fragmental horizontal section on the line indicated by 9—9, Fig. 3.

Figure 1:
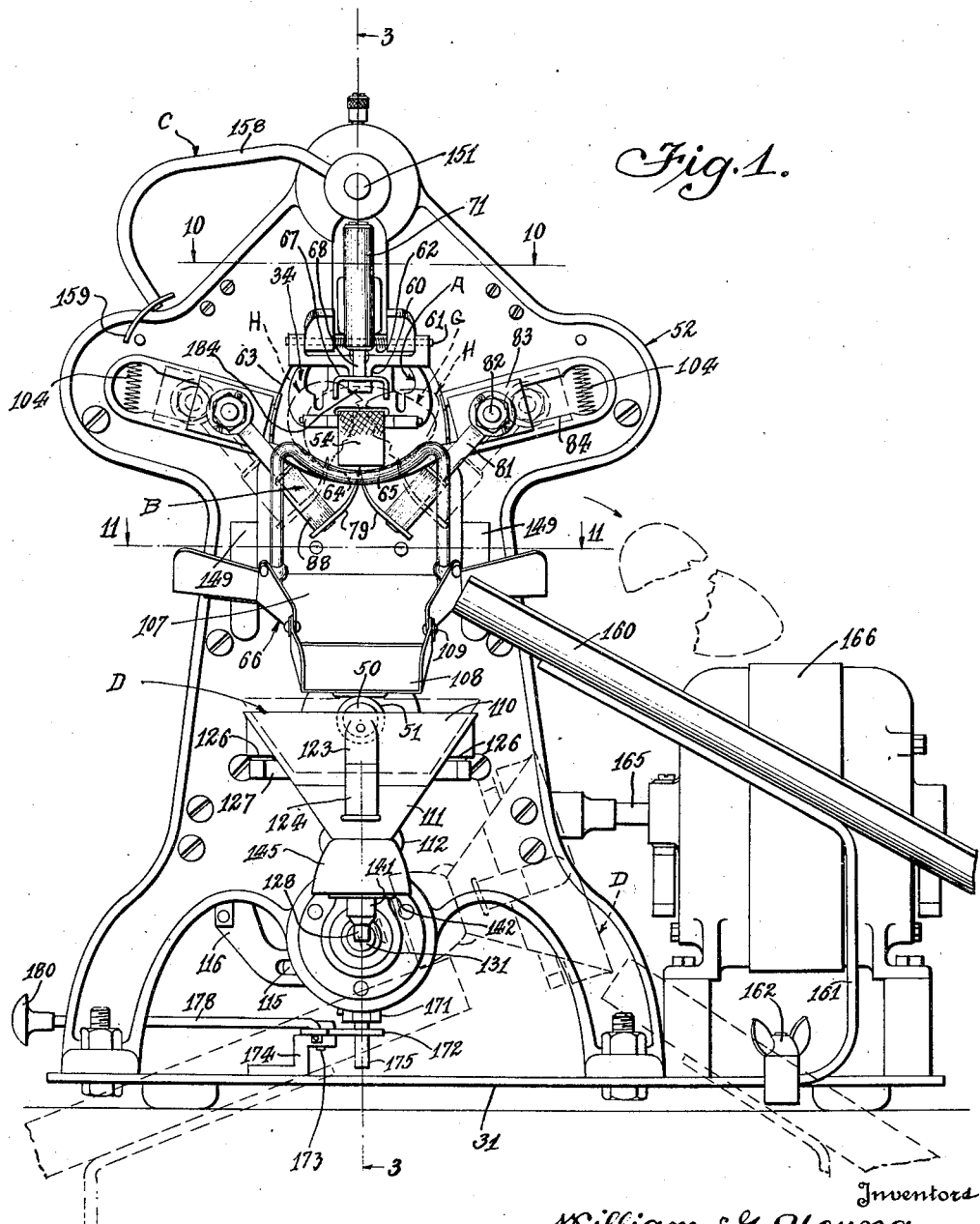
Figure 2:
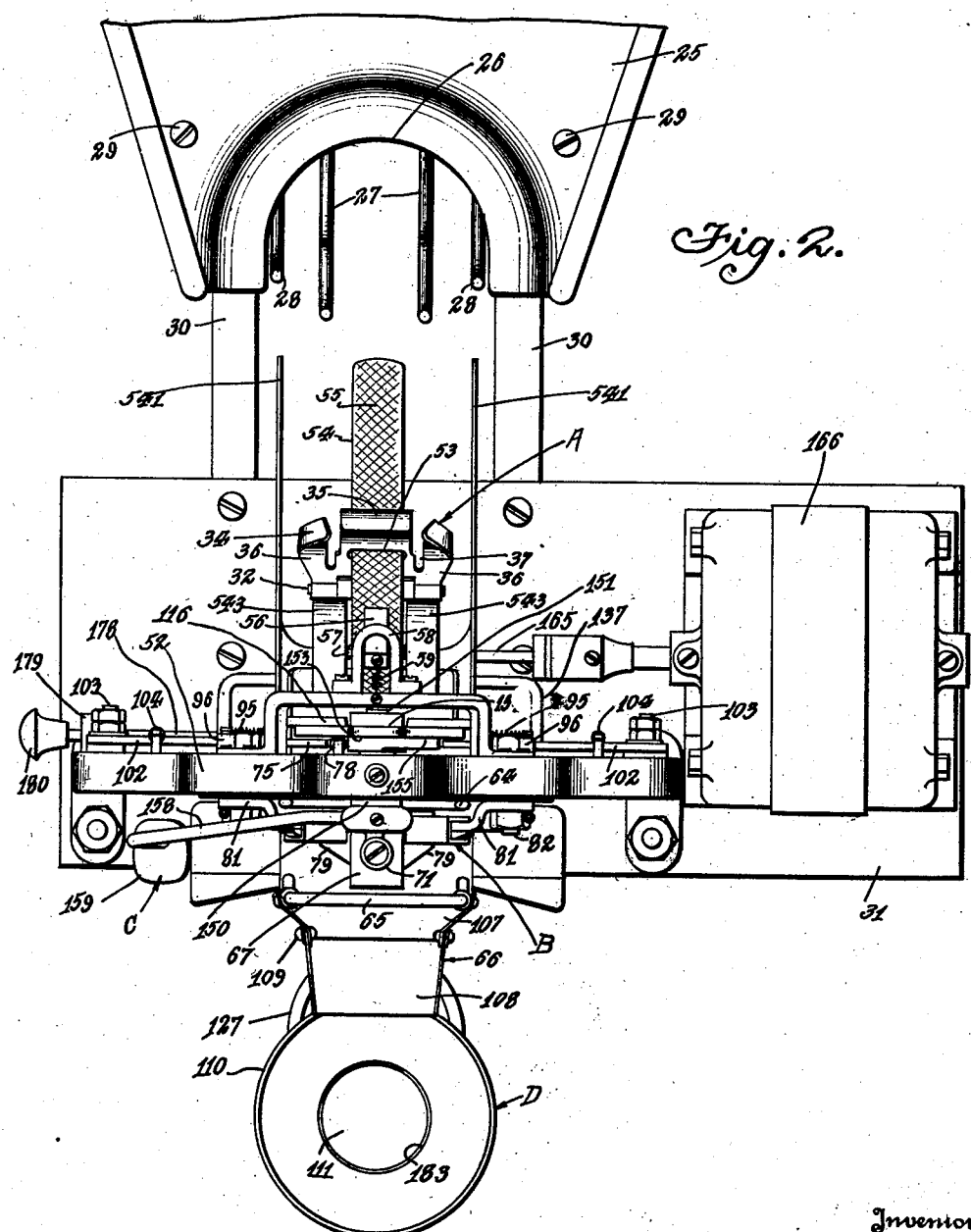
Fig. 2 is a plan view of Fig. 1. A fragment of a feed chute is also shown.
Figure 10:
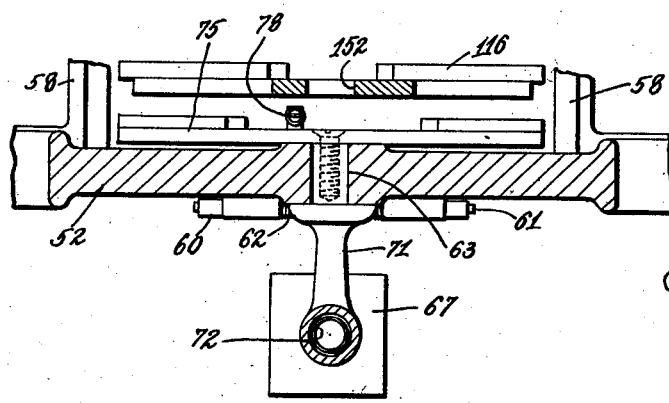

Fig. 10 is an enlarged fragmental section on the line indicated by 10—10, Fig. 1.

Fig. 11 is an enlarged fragmental horizontal section on the line indicated by 11—11, Fig. 1, illustrating particularly the construction for removably mounting the discharge chute.

Fig. 12 is an enlarged fragmental vertical section on the line indicated by 12—12, Fig. 11.

Fig. 13 is an enlarged inverted plan view from the line indicated by 13—13, Fig. 3, illustrating particularly the mounting for the egg separating cup and the latch that removably secures it.

Figure 4:
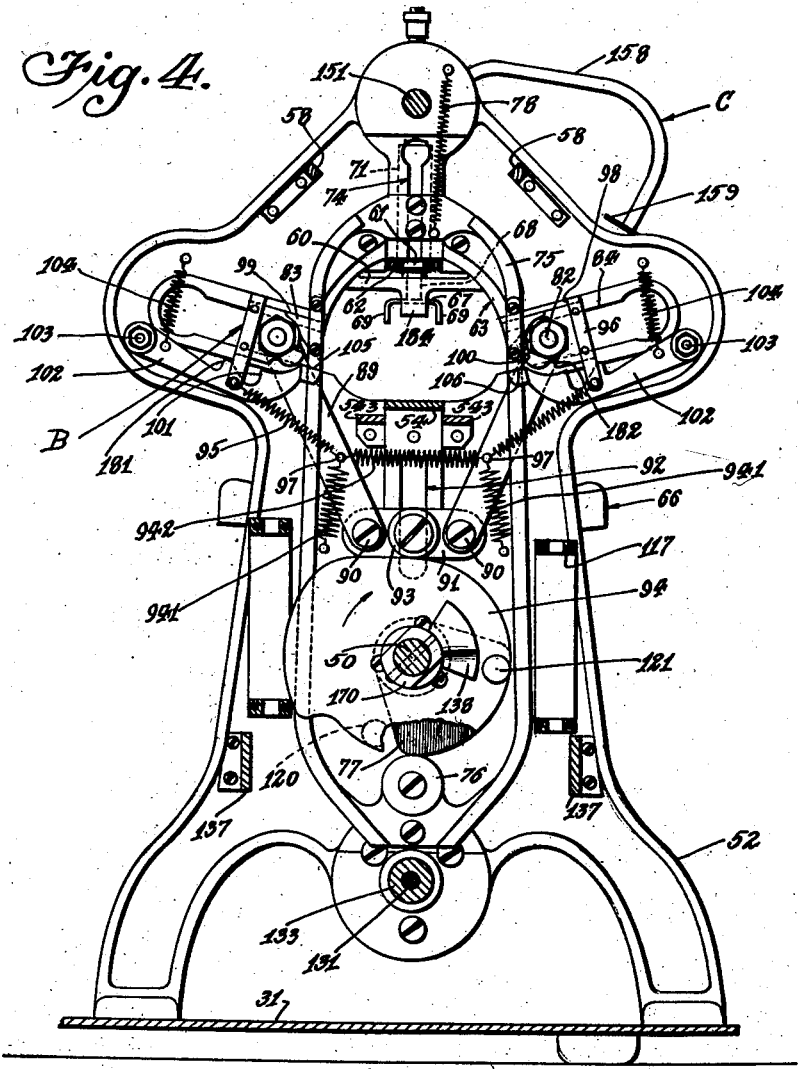
Fig. 4 is an elevation, partly in section, approximately from the line indicated by 4—4, Fig. 3, only the cracking mechanism, the gate and the frame being shown.

Fig. 14 is an enlarged fragmental detail of a portion of the egg cracking mechanism, the view of the parts being similar to the illustration of said parts in Fig. 4, excepting that the movable parts are in a different position.

Fig. 15 is an enlarged fragmental detail, similar to Fig. 14, excepting that the movable parts are in a still different position than shown in either Figs. 4 or 14.

Fig. 16 is an approximately horizontal section on the line indicated by 16—16, Fig. 14.

Fig. 17 is an approximately vertical section on the line indicated by 17—17, Fig. 14.

Fig. 18 is a fragmental sectional view on the line indicated by 18—18, Fig. 14.

Fig. 19 is an enlarged detail, partly in section, of the construction whereby one of the cracking elements is detachably mounted on its actuating arm.

Referring to the drawings and taking the various mechanisms in the order in which they operate on the eggs, which mechanisms are indicated in general as follows: The egg feeding mechanism is indicated at A, the egg cracking mechanism is indicated at B, the egg shell ejecting mechanism is indicated at C, and the egg separating mechanism is indicated at D.

The eggs that are to be operated on may be placed in a suitable receptacle as, for example, in a feed chute 25, only a fragment of which is shown in the drawings. The bottom of the chute 25, at its discharge end, is provided with a semicircular opening 26 and projecting upwardly through said opening are a number of upwardly spaced curved fingers 27, 28 which are clamped at 29 to a bracket 30 that is suitably secured to the base 31 of the machine. The fingers 28 extend upwardly above thhe level of the fingers 27 and the spacing of said fingers is such that eggs rolling onto said fingers will not pass between them.

An egg is indicated at E resting on the fingers 27, and the feeding mechanism A, by which the egg E is fed to the cracking mechanism B, will now be described.

Pivoted at 32 to an arm 33 is an egg lifting member or spoon 34 comprising a curved bottom section 35 and curved side sections 36. The sections 35, 36 are spaced apart to form slots 37 to permit entrance of the fingers 27 when the member 34 is in the position shown in broken lines in Fig. 3. Thus the descending member 34 may readily pass the egg E because when said member contacts with the egg it turns on its pivot 32. The member 34 is normally held in its extended position, relative to the arm 33, as shown in solid lines in Fig. 3, by a coil spring 38 which is secured at one end to the member 34 and at its opposite end to the arm 33. The arm 33 is pivotally mounted at 39 on a standard 40 and the arm 33 is actuated by a link 41 which is pivoted at 42 to the arm 33 and at 43 to a slide 44 which works in a vertical guide slot 45 of the standard 40.

The slide 44 is actuated by a pitman 46 which is pivoted at 47 to the slide 44 and pivoted at 48 to a crank arm 49 on a main drive shaft 50. The drive shaft is mounted in a relatively long bearing 51 carried by a standard 52 which is bolted or otherwise secured to the base 31.

The standard 40 is also bolted to the base 31. The section 35 of the egg lifting member 34 is provided with an orifice 53 to permit to extend therethrough a curved egg support 54 which is secured at its forward end to the standard 52. The standards 40, 52 and base 31 together constitute the frame of the machine. The rear end of the support 54 is adjacent to but spaced somewhat from the upper ends of the fingers 27. The radius of curvature of the support 54 has for its center the axis of the pivot 39 so that the egg lifting member can readily move from end to end of the support 54 without binding of the section 35 on said support. The upper surface of the support 54, or at least the rear portion thereof, is preferably roughened or provided with slight projections or teeth 55, or any other suitable means for producing sufficient friction against the egg shell to cause the egg to roll when it is raised into contact with the support 54. Extending along both sides of the support 54 are side walls 541 which function as guides for the eggs so as to maintain the eggs substantially centrally on the support 54. The support 54 and the walls 541 together constitute, in effect, a trough, though the walls 541 are spaced somewhat from the support 54. The walls 541 are secured by a fastening means 542 to the upper horizontal portion 543 of the standard 40.

When the egg reaches a position somewhat forwardly of the middle of the support 54, it is desirable that gravity tends to move the egg to the extreme forward end of the support 54, but to yieldingly resist rolling of the egg forward from its midposition on the support 54, there is provided a retarding arm 56 which is pivoted at 57 to a bracket 58 that is mounted on the standard 52. The arm 56 is yieldingly held aslant downwardly and rearwardly by a spring 59 which is secured at one end to the upper end of the arm 56 and at its other end to the bracket 58. The spring 59 is above the pivot 57 and accordingly resists movement of the lower end of the arm 56 forwardly. The lower end of the arm 56 extends to a point that is adjacent to the path of travel of the free end of the egg lifting member 34 so that when the egg is moved forwardly by the lifting member 34 said egg will engage the retarding arm 56 and thus be held against rolling along the support 54 faster than the movement of the lifting member 34. The arm 56 yieldingly retards the egg until said egg has been moved forwardly by the lifting member 34, into engagement with the egg, indicated at F in Fig. 3, that has previously been lifted and moved forwardly by the member 34.

Further movement forward of the egg that is being pushed by the member 34 will thrust the egg F forwardly past a gate 60 which is pivoted at 61 to the standard 52. The gate 60 is yieldingly held in vertical or closed position, as shown in Fig. 3, by a coil spring 62 which presses against the front face of the gate. The gate is held against moving rearwardly beyond its vertical position by reason of engaging the front face of the standard 52. The gate 60 is suspended in an opening 63 provided in the standard 52 and the egg passes through said opening 63, when pushed by the egg to the rear of the egg F.

The purpose of the gate 60 is to momentarily stop rolling of the egg in order to insure that the yolk regains its central position in the egg, out of which central position it tends to be thrown by centrifugal action as the egg is quickly rolled along the support 54 by the lifting member 34. It is essential that the yolk not be too close to that part of the shell that the cracking elements enter, as described hereinafter, so that said cracking elements do not break the membrane that holds the fluid yolk substance intact, for, if that occurred, separation of the yolk and white would be impossible.

When the egg passes through the opening 63, it rolls about its short diameter into a rack that, in this instance, comprises a pair of spaced concave members 64, 65, the members 65 being in front of the member 64 and said members extend transversely of the machine. In this instance the rack members 64, 65 are mounted on a discharge chute which is indicated in general by the character 66 and which will be described in detail hereinafter.

The rack 64, 65 constitutes a part of the egg cracking mechanism B which will now be described in detail: After the egg comes to rest upon the rack members, a means to yieldingly hold said egg from above comes into action and said means, in this instance, is constructed as follows: An egg contacting member 67 is mounted on the lower end of a plunger 68, said member 67 being provided with vertical flanges 69 having their bottom edges concave, as indicated at 70 so as to approximately fit the outer face of the egg shell with which they come in contact. The plunger 68 is vertically shiftable in a slide 71, being yieldingly held in its lower position, relative to the slide, by a coil spring 72 which is positioned between the plunger 68 and the upper end of a spring chamber 73 in which the spring is mounted. The slide 71 works in a vertical guide slot 74 which is provided in the standard 52.

To vertically reciprocate the slide 71, said slide is secured to the upper end of a vertical yoke 75 which is provided near its lower end with a follower in the form of a roller 76 that is pushed downwardly by a cam 77 mounted on the shaft 50. The yoke 75, when released by the cam 77, is retracted by a coil spring 78 which is secured at one end to the yoke 75 and at its other end to the standard 52, near the upper end of said standard.

The egg thus being yieldingly held by the flanges 69 of the member 67, at the proper time in the cycle of operations of the various mechanisms, cracking elements 79 are adapted to strike the shell of the egg approximately centrally of the shell on the lower side thereof so as to break or crack said shell. These cracking elements, in this instance, are in the form of blades, each provided with a concave cutting edge 80 and, when the blades are in cutting position, they are positioned with their cutting edges lying side by side, from which edges the blades slant downwardly and outwardly. (See Fig. 1.)

The blades 79 are detachably mounted on bell crank levers 81 which are pivoted at 82 in slides 83 that operate in guide slots 84 provided in the standard 52.

In this instance the construction for detachably mounting the cracking blades on the bellcrank levers 81 is as folows: The construction for each arm is the same. The blade is provided with a shank 85 of rectangular cross section and the bellcrank lever 81 is also of rectangular cross section and provided with a stud 86 adapted to fit in a hole 87 in the shank 85. Slidably mounted on the bellcrank lever 81 is a sleeve 88 of square cross section which, when the shank has been assembled with the pin 86 in the hole 87, is slid over the shank, as clearly shown in Fig. 19. This construction enables the blades to be quickly detached from the arms for cleansing of said blades.

The slides 83 are actuated by pitmen 89, the pivots 82 of the bellcrank levers 81 serving, also, to pivotally connect the pitmen 89 to the slides 83. The pitmen 89 are pivotally connected at 90 to a cross head 91 which operates in a vertical guide slot 92 provided in the standard 52. (See Fig. 14.)

The cross head 91 is provided with a follower 93 which, in this instance, is in the form of a roller that is actuated by a cam 94 mounted on the drive shaft 50. Thus the slides 83 are actuated away from one another in order to open the egg shell after it has been cracked by the blades 79.

The roller, 93 is held against the cam 94 by coil springs 941 which are secured at one end to the standard 52 and at their other ends to studs 97 that project from the pitmen 89. Movement of the slides 83 toward each other is produced by a coil spring 942 which is secured at its opposite ends to the studs 97. The blades 79 are swung toward one another to contact with the egg shell to break it by coil springs 95 which are connected at one end to arms 96 of the bell-crank levers 81. Other ends of the springs 95 are secured to the studs 97.

Stops are provided to limit inward swinging of the bellcrank levers 81 and, in this instance, said stops are formed by shoulders 98 on the arms 96 coming into engagement with shoulders 99 on the slides 83, as clearly shown in Fig. 17.

Latching means are provided for holding the bellcrank levers 81 with their blades 79 retracted or, in other words, swung outwardly away from one another, against the tension of the springs 95 and these means are the same for each lever. Accordingly, each bellcrank lever 81 is provided with a shoulder 100 adapted to be engaged and held against rotation in one direction by a shoulder 101 on a detent or latching arm 102 which is pivoted at 103 to the standard 52. Coil springs 104 are provided to yieldingly hold the detents 102 toward the shoulder 100.

To retract the detents 102 out of latching position, the yoke 75 is provided at opposite sides with shoulders 105 which, upon downward motion of the yoke 75, engage shoulders 106 on the detent arms 102, thus to swing said arms downwardly against the tension of the springs 104, thereby releasing the bellcrank levers 81 and permitting said bellcrank levers to be swung inwardly by their actuating springs 95.

When the latching arms 102 release the shoulders 100, the slides 83 are free to be drawn toward each other by reason of the contraction of the spring 942. However, before the slides 83 move inwardly, the yoke 75 is shifted upwardly, thereby releasing the latching arms 102 and permitting said latching arms to swing upwardly, so that upon inward movement of the slides 83 shoulders 181 on the latching arms 102 engage shoulders 182 on the lever arms 96, thus causing the said lever arms 96 to turn in a direction that causes the blades 79 to be swung away from one another. Thus, at this time in the cycle of the machine, there is a compound movement of the bellcrank levers 81, since said levers are bodily moved toward one another and, at the same time, are swung outwardly on their pivots 82.

After the shell of the egg has been cracked and opened up by movement of the blades away from one another, the contents of the shell flow therefrom into the discharge chute 66 which comprises an upper stationary section 107 and a lower pivoted section 108 that is pivoted at 109 to the section 107. The purpose of pivoting the chute section 108 will appear hereinafter. The contents of the shell flow from the chute 66 into the egg separating mechanism D which will now be described: The whites and yolks of the eggs discharge from the lower end of the chute 66 into a cup which comprises an upper or rim section 110 and a bottom section 111. The cup is tiltably mounted and, accordingly, is supported on an angular arm 112 secured to a hollow rock shaft 113 that turns in a bearing 114 carried by the standard 52. The rear end of the rock shaft 113 is provided with a crank arm 115 which is actuated by a reciprocably mounted member 116 that, in this instance, is in the form of a yoke.

The yoke 116 reciprocates vertically in guides 117 on the standard 52. A positive means is provided for actuating the yoke 116 in opposite directions and, accordingly, in this instance, the yoke 116 is provided on its opposite sides with shoulders 118, 119 adapted to be engaged by shoulders 120, 121, respectively, which project from opposite faces of the cam 94.

Thus the shoulder 120 engages the shoulder 118 to move the yoke on its downstroke and the shoulder 121 engages the shoulder 119 to actuate the yoke on its upstroke.

The upper section 110 of the cup is movably mounted so that it can move away from the lower section 111, to thereby permit the white of the egg to discharge over the rim of the cup section 111. In this instance, the cup section 110 is reciprocably mounted on the lower cup section 111, hollow studs 122 projecting downwardly from bosses 123 on the section 110 into guides 124 that project from opposite sides of the section 111. Within the hollow studs 122 are coil springs 125 which are connected at their upper ends to the section 110 and at their lower ends to the guides 124 so as to yieldingly hold the upper section 110 upon the lower section 111.

A means is provided for raising the cup section 110 against the retractive tension of the springs 125 and this means is constructed, in this instance, as follows: The upper section 110 is provided at opposite sides, midway between the bosses 123, with shoulders 126, and adapted to engage beneath said shoulders is a fork 127. The fork 127 is provided with a downwardly projecting arm 128 which is pivoted at 129 on the arm 112 that is provided with an opening 130 through which the arm 128 projects.

The arm 128 is actuated to raise the outer ends of the fork 127 by a longitudinally shiftable member 131 which, in this instance, is in the form of a rod that extends through the hollow shaft 113 and that slides in bearings 132 provided in the opposite ends of said shaft 13. Movement of the rod 131 to the right in Fig. 3 is restricted by a shoulder 133 on said shaft contacting with the inner end of the adjacent bearing 132, and the member 131 is moved to the right by a coil spring 134 that surrounds the shaft 131 between the shoulder 133 and that bearing 132 which is most remote from the shoulder 133.

To push the member 131 to the left against the expansive force of the spring 134, there is provided a lever 135 that is pivoted at 136 to a bracket 137 that is supported by the standard 52 and that constitutes a portion of the frame of the machine. The lever 135 is positioned vertically and the lower end thereof engages one end of the member 131 while the upper end thereof is actuated by a cam face 138 which constitutes a portion of one face of the cam member 94. Preferably the upper end of the lever 135 is provided with a roller 139 for rolling on the cam face 138. The lower cup section 111, preferably, is detachably mounted on the arm 112 so that the cup can be quickly removed when it is desired to cleanse it. Accordingly, the arm 112 is provided in its outer end with a vertically extending square hole 140 into and through which projects a stud 141 of square cross section, said stud 141 projecting downwardly from the bottom of the cup section 111.

For detachably securing the stud 141 in the hole or socket 140, there is provided a latch 142 which is pivoted at 143 to the underface of the arm 112 so as to operate horizontally when the arm 112 is in the upright position shown in Fig. 3. The latch 142, when closed, engages in a notch 144 provided in one side of the stud 141. Thus, to remove the cup from the arm 112, the latch 142 will be pushed to one side and then the cup raised to withdraw the stud 141 from the socket.

Though the lower section 111 of the cup could rest directly upon the upper face of the arm 112, it is preferable to interpose between the cup section 111 and the arm 112 an inverted cup shaped guard 145 that is provided in one side with a notch 146 to permit of projection therethrough of the arm 112. The guard or cover 145 can thus be readily lifted off, after the cup has been removed, so that said guard, also, can be cleansed, for it will be readily understood that when the whites of the eggs discharge over the rim of the cup section 111 some of the whites will come in contact with the guard 145, whereas if the guard were not provided, the whites would come in contact with the arm 112.

Contacting of the egg whites with the arm would not be objectionable if the broken eggs were fresh, but, since stale eggs also pass through the machine, it is essential that those parts of the machine contacted by the white of a stale egg be cleansed so as not to contaminate the whites of fresh eggs that follow the stale egg through the machine. Accordingly, in practice, there will be provided a number of cups 110, 111 and guards 145 and, also, chutes 66 so that these parts can be readily cleansed in the event of their being contacted by stale eggs.

As suggested above, it is advisable that several discharge chutes be furnished with each machine and, accordingly, the chutes 66 will preferably be detachably mounted on the standard 52. In this instance, this is provided for by providing the chute 66 with a pair of laterally projecting ears 147 which engage in slots 148 that are formed between the lugs 149 and the front face of the standard 52, said lugs 149 being secured to said front face. The slots 148 open upwardly, thus enabling the chute to be removed by raising it.

It is desirable that the discharge end of the chute 66 overhangs the cup section 110 and be positioned quite close to said cup section and that is the reason for pivoting the chute section 108 to the section 107, since when the upper cup section is actuated upwardly it strikes the under face of the lower chute section 108 and swings said lower chute section upwardly. As the upper cup section descends, the chute section 108 is lowered by gravity.

The vertical motion of the yoke 116 is also utilized for actuating the shell ejecting mechanism which will now be described. Rotatably mounted in a bearing 150, in the upper end of the standard 52, is a rock shaft 151 that, in this instance, passes through a vertical slot 152 in the upper portion of the yoke 116. The shaft 151 is provided on opposite sides of the yoke 116 with shoulders 153, 154 to act as further guides for said yoke 116. The shaft 151 is provided with a crank arm 155 which defines the shoulder 153 and which has a stud 156 that works in a horizontal slot 157 in the yoke 116, near the upper end of said yoke. Thus vertical reciprocatory movement of the yoke 116 effects swinging of the crank arm 155 so as to rock the shaft 151. The shaft 151 is provided with an arm 158 which swings in front of the standard 52, the outer end of said arm 158 being provided with a shell ejecting head 159 which, in this instance, is preferably concave on the face that contacts with the egg shell.

Thus, after the shell has been cracked and the halves thereof pulled apart by the blades, the ejector head 159 will be propelled from the outer position, shown in Fig. 1, to its inner position, shown in broken lines in Fig. 5, thereby causing the head 159 to strike the egg shell, thereby propelling said shell laterally from the machine into a shell discharge chute 160 which, in this instance, is supported by a bracket 161 secured by a clamping screw 162 to the base.

The shaft 50, in this instance, is driven by a wormwheel 163 that meshes with a worm 164 mounted on a shaft 165 of an electric motor 166. The motor 166, in this instance, is mounted on one end of the base 31. In this instance, the wormwheel 163 does not drive the shaft 50 direct, but, rather, through a clutch, one member of which is indicated at 167 and the other at 168. Accordingly, the wormwheel 163 is loose on the shaft 50. The clutch member 168 has a jaw 169 that is in sliding contact with a jaw 170 fixed to the shaft 50, the jaws 169, 170 serving the purpose of splining the clutch member 168 to the shaft, thus causing said clutch member 168 to rotate with the shaft but permitting it to be shifted into and out of engagement with the clutch member 167. The clutch member 168 is operated by the usual shifting fork 171 which, in this instance, is pivotally mounted by the pivot 136 on the bracket 137.

The shifting fork is actuated by a bell crank lever 172 which is pivoted at 173 on a pivot support 174 that is mounted on the base 31, the fork 171 having a cylindrical lower end portion 175 which projects through a hole 176 in the bell crank lever 172. Pivotally connected at 177 to the bell crank lever is an operating rod 178 that is shiftably mounted in a bearing 179 secured to the standard 52. The outer end of the rod 178 is provided with a knob 180.

The foregoing will make clear the construction and operation of the invention and, briefly stated, the operation is as follows:

Assuming, that at the beginning of the cycle, the spoon 34 is in the position indicated in broken lines in Fig. 3 and that the blades 79 are in the positions indicated in broken lines in Fig. 1, the operation of the motor will cause the spoon 34 to swing downwardly until said spoon is beneath the egg E, pivoting, meanwhile, so as to pass said egg. After the spoon reaches a position beneath the egg E, continued operation of the motor causes the spoon to rise, thus picking up the egg E and carrying said egg onto the support 54 and rolling said egg along said support. The idea of rolling the egg is to cause advancement of said egg toward the cracking mechanism with the long axis of the egg extending transversely of the support 54 so that the egg will discharge sideways into the rack 64, 65, as shown at G in Fig. 3.

When the egg has reached the arm 56, it moves said arm to the left in Fig. 3 against the tension of the spring 59 and thus the egg is held against the spoon 34, as the egg begins to travel down the forwardly sloping portion of the support 54. As soon as the egg reaches the gate 60, said gate will temporarily obstruct further movement of the egg until the machine is operated to again move the spoon 34 into position to pick up another egg from the chute 25 and to carry the second egg into position to engage the first egg. As the spoon 34 moves forwardly with the second egg, said second egg presses the first egg past the gate 60, which swings upwardly to permit the first egg to discharge onto the rack, the gate then closing and thus holding back the second egg. As soon as the first egg has been deposited on the rack, the egg contacting or clamping member 67 will be caused to descend from its upper position to the lower position shown in Fig. 3, thus yieldingly holding the egg downwardly on the rack.

It will be seen that the clamping member 67 is self-adjusting to different sizes of eggs.

As soon as this has come to pass, the detent arms 102 will be actuated by the shoulders 105 into position to release the bell crank levers 81 which, accordingly, will be swung inwardly by the springs 95 to the solid line position shown in Fig. 1, causing the blades 79 to cut, crack or break the shell of the egg on the rack.

Further operation of the machine then causes movement of the slides 83 away from each other, thus drawing the blades 79 apart, as indicated in broken lines in Fig. 1, and, since said blades have penetrated the egg shell, this movement pulls the two egg shell portions away from each other, thus permitting the contents of the shell to discharge therefrom into the cup 110, 111. The broken apart portions of the egg shell are indicated at H in Fig. 1.

The timing of the operation of the various mechanisms is preferably such that after the egg yolk and white are deposited in the cup, the cup will remain stationary for an interval of time to permit the operator to smell of the egg in the cup. If the egg should be stale, the operator immediately throws out the clutch so as to stop the machine and the operator then detaches the cup and the guard 145 and may, if desirable, also detach the chute 66. In case such parts are detached for cleansing, other like parts will be immediately substituted and then the machine will again be put into operation.

Assuming that the contents of the cup 110, 111 pass the smelling test, further operation of the machine then lifts the upper cup section 110, thereby permitting the white of the egg to run over the rim of the lower cup section 111 into any suitable container that is placed to receive it. The upper cup section then automatically descends, cutting off the white of the egg from the yolk which remains in the lower cup section.

As soon as the cup section 110 has closed onto the section 111, further operation of the machine will cause the entire cup to be tilted, thus discharging therefrom the yolk into a suitable container or chute placed to receive said yolk and not illustrated in the drawings.

Coincidentally with tilting of the cup, the shell ejecting head 159 is caused to swing against the broken egg shell so as to propel said shell laterally from the machine into the chute 160.

Shortly after the slides 83 have been moved outwardly to pull apart the cracked egg shell, as previously described, the latch arms 102 are released so that their shoulders 181 lie in the paths of movement of the shoulders 182. The slides 83 are now shifted toward one another, thereby bringing the shoulders 181, 182 in contact, thus causing rotation of the bell crank levers 81, these parts then occupying the positions shown in Fig. 15, and, thus, the blades 79 are ready for cracking another egg.

After the egg shell has been cracked and before it is struck by the ejector head 159, the slide 71 is moved upwardly, thus relieving the egg shell from the pressure of the clamping member 67.

After the cup has been tilted, it is turned into upright position again ready to receive the white and yolk of another egg.

The cycle of operations above described will then be repeated as long as the machine is kept in operation. In many instances it is not desired to separate the whites and yolks of the eggs, after their shells have been cracked and the contents allowed to run therefrom and, in such cases, the separating cup 110, 111 will be removed so that the whites and yolks discharge together from the chute 66 into a suitable container placed to receive them.

It is to be noted that the rim of the lower cup section 111 is outwardly and downwardly beveled, as indicated at 183, and that the lower end of the upper section 110 is of somewhat larger inside diameter than the inside diameter of the rim of the lower cup section 111. This construction insures against rupturing the sack or membrane that holds the yolk.

It is to be noted that, when the egg is picked off of the fingers 27 by the spoon 34, any other eggs that may tend to be crowded onto the spoon from the opposite sides thereof will be prevented from so doing by reason of the fingers 28 engaging and holding said other eggs back while the spoon moves away from said fingers.

In practice, the eggs customarily spin about their short axes when they are deposited upon the members 54, and it is to stop the spinning of the eggs that the arm 56 is particularly provided. The arm 56, being positioned in a vertical plane that passes through the center of the spoon, engages the egg midway between its ends and holds it toward the spoon and, thus, the egg is clamped between the spoon and the arm 56. The clamping, however, is not so severe as to prevent the egg rolling along the member 54 and this maintains the egg in position with its longitudinal axis at a right angle to the plane in which the blades strike the egg. Since it is very important that the egg be deposited in this position in the rack, the middle portion of the gate 60 is provided with a downwardly projecting lip 184 so that only this lip engages the egg, thereby preventing one end of the egg advancing faster than the other end which, if it occurred, would possibly entail deposit of the egg in such position on the rack that the cracking blades would strike one end portion of the egg shell instead of the middle portion of said shell. Since the semispherical ends of an egg shell are exceedingly strong, the blades would not crack them and it is then necessary to remove the egg before the succeeding egg pushes it off of the rack.

Where, in the claims, we have specified "a rack", it is to be understood that we limit ourselves to the use of the word in its generally accepted sense, that is, to a frame work on which an egg rests freely as distinguished from devices such as vacuum or friction cups that grip an egg.

We claim:

1. In a machine of the class described, a rack to support an egg, a means operating to crack the shell of the egg while supported on the rack and to then force the portions on opposite sides of the crack away from each other to permit the contents to flow from the shell, and a means independent of said rack to positively eject the egg shell from the rack after the contents have flowed therefrom.

2. In an automatic egg breaking machine of the class described, a stationary rack to support an egg, means to feed an egg to said rack, and a means independent of said rack operating to strike and crack the underside of the shell of said egg while supported on the rack and to then open out the portions on opposite sides of the crack to permit the contents to flow from the shell.

3. In an automatic egg breaking machine of the class described, a stationary rack to support an egg, means to feed an egg to said rack, a clamping means operating against one side of the egg to hold it against the rack, and a cracking means independent of said rack operating against the opposite side of the egg shell.

4. In an automatic egg breaking machine of the class described, a stationary rack to support an egg, means to feed an egg onto said rack, a means operating against the upper side of the egg to hold it down on the rack, and a means operating to crack the lower side of the egg and to then open out the portions on opposite sides of the crack to permit the contents to flow from the shell.

5. In a machine of the class described, spaced rack members, blades, means to hold an egg downwardly on the rack members and to then release the egg, a means to move the blades upwardly between the rack members to adjacent positions and to then move the blades away from each other while the holding means is engaged with the egg, and a means to eject the egg shell laterally from the rack members when the holding means releases said shell.

6. In a machine of the class described, shiftably mounted slides, arms pivotally mounted on the slides, cracking members carried by the arms, a means to shift the slides toward and from each other, a means to swing the arms toward and from each other, and a means to hold an egg in position to be struck by the cracking members.

7. In a machine of the class described, an arm for an egg to roll on, a spoon provided with an orifice to receive the arm, and a means to reciprocate the spoon along the arm.

8. In a machine of the class described, spaced members to support an egg, an arm for the egg to roll on terminating adjacent to said members, a spoon provided with an orifice to receive the arm, and a means to reciprocate the spoon to carry an egg from the spaced members onto the arm.

9. In a machine of the class described, spaced members to support an egg, an arm for the egg to roll on terminating adjacent to said members, a movable mounted arm, a spoon pivoted to the movably mounted arm and dimensioned to pass between said spaced members provided with an orifice to receive the arm, a spring yieldingly holding the spoon against swinging upwardly relative to the movably mounted arm, and a means to oscillate the movably mounted arm between a position below the spaced members and a position along the first mentioned arm.

10. In a machine of the class described, spaced members to support an egg, an arm for the egg to roll on terminating adjacent to said members, a movably mounted arm, a spoon pivoted to the movably mounted arm and dimensioned to pass between said spaced members and provided with an orifice to receive the arm, and a means to oscillate the movably mounted arm between a position below the spaced members and a position along the first mentioned arm.

11. In a machine of the class described, a rack to support an egg, an arm extending to the rack, a movably mounted gate above the arm adjacent to the rack, said gate when in its position of stable equilibrium projecting toward the rack and offering yielding resistance to motion toward the rack, a means to move an egg along the arm to the gate, and a means to break the egg on the rack.

12. In a machine of the class described, a rack to support an egg, an arm extending to the rack, a movably mounted gate above the arm adjacent to the rack, a spring to yieldingly hold the gate against movement toward the rack, a means to move an egg along the arm to the gate, and a means to break the egg on the rack.

13. In a machine of the class described, a rack to support an egg, an arm extending to the rack, a movably mounted gate above the arm adjacent to the rack, a spring to yieldingly hold the gate against movement toward the rack, a means to move an egg along the arm to the gate, a means yieldingly mounted above the arm in position to retard movement of the egg toward the gate, and a means to break the egg on the rack.

14. In a machine of the class described, a rack to support an egg, a member mounted to reciprocate vertically above the rack, a plunger mounted in said member, a means yieldingly pressing the plunger downwardly to engage the egg on the rack, a means to strike the under side of the shell of the egg on the rack to crack said shell, and a means to reciprocate said member and to operate the striking means in timed relation.

15. In a machine of the class described, a means to crack and open the shell of an egg, a tiltably mounted cup for receiving the contents of the shell, a means to tilt the cup, said cup including a bottom section and a rim section movably mounted relative to the bottom section, a means to move the rim section away from the bottom section, and a means to operate all of said other mentioned means in timed relation.

16. In a machine of the class described, a means to crack and open the shell of an egg, a tiltably mounted cup for receiving the contents of the shell, a means to tilt the cup, said cup including a bottom section and including a rim section mounted for up and down movement relative to the bottom section, a means to raise the rim section, and a means to operate all of said other mentioned means in timed relation.

17. In a machine of the class described, a means to crack and open the shell of an egg, a tiltably mounted cup for receiving the contents of the shell, a means to tilt the cup, said cup including a bottom section and including a rim section mounted for up and down movement relative to the bottom section, a means to raise the rim section, a means to operate all of said other mentioned means in timed relation, and a chute section pivoted to swing vertically and positioned with its discharge end in the path of movement of the upper cup section when said upper cup section is rising.

18. In a machine of the class described, a means operable to grip and then release an egg, egg shell penetrating members, a means operating while the egg is held by the gripping means to first force said members through the egg shell and to then move said members apart to open said shell, a member movably mounted in position to strike the shell, and a means operating in timed relation with the gripping means to move said member into engagement with the shell after the egg is released by said gripping means.

19. In a machine of the type described, a pair of stationary, parallel, spaced-apart, egg supporting rack members, means to hold an egg downwardly on said rack members, and means to crack the under side of said egg while supported on said rack members, said rack members being curved upwardly at each end whereby said egg is automatically centered thereon beneath said holding means.

20. In a machine of the type described, a pair of stationary, parallel, spaced-apart, egg supporting rack members, means to hold an egg downwardly on said rack members, said rack members being curved upwardly at each end whereby said egg is automatically centered thereon beneath said holding means, a pair of blades, means for moving said blades upwardly between said rack members into adjacent positions to penetrate the under side of an egg held on said rack by said holding means, and for thereafter moving said blades laterally apart in paths approximately parallel to said rack members, whereby the shell of said egg is broken at the middle of its under side and the two halves separated, the upper edges of said halves remaining adjacent each other below said holding means and the lower edges being supported by and sliding along said curved supporting members.

21. In a machine of the class described, a rack comprising two parallel supporting members for supporting an egg, a means operating to crack the shell of the egg while supported on the rack and to then force the portions of shell on opposite sides of the crack away from each other to permit the contents to flow from the shell, and means movable in a path substantially parallel to said supporting members to slide the egg shell along said members and eject it from the end thereof.

22. A machine as described in claim 20 further characterized in that it comprises means for dropping said knives away from said half shells after their opening movement whereby said half shells are supported solely by said stationary rack members and drainage of the egg contents from said shell is not impeded by said knives.

23. In a machine of the type described, a pair of parallel stationary rack members spaced apart to support an egg, means for feeding an egg to said rack, breaking and opening means, and means for moving said breaking means upwardly between said rack members to break the shell of said egg, then outwardly substantially parallel to said parallel rack members to open said shell, and thereafter away from said rack, whereby said opened egg shell is left solely supported by said rack to facilitate drainage of the contents therefrom.

24. In a machine of the class described, a single means for breaking and opening an egg, separate means for supporting said egg during the breaking and opening thereof, separate means for successively feeding eggs to said supporting means, and means for operating said feeding and breaking means in timed relation.

25. In a machine of the type described, a stationary rack to support an egg, an arm extending to the rack, means to move an egg along the arm to the rack, means to break the egg on the rack and means to operate said moving and breaking means in timed relation.

26. In a machine of the class described, an arm for an egg to roll on, said arm having a laterally flat upper surface whereby it contacts with an egg positioned thereon at only one point, a spoon for rolling an egg along said arm, and means to move said spoon in a path immediately above and parallel to said arm.

27. In a machine of the class described, means for supporting an egg, an arm for the egg to roll on terminating adjacent to said means, a spoon for rolling an egg from said means onto and along said arm, and means to move the spoon to carry an egg from said means onto and along said arm.

28. In a machine of the type described, a stationary rack of open construction to support an egg, means for feeding eggs to said rack, means to open an egg on said rack to permit the contents to drain through the rack, an ejector plate movable across and above said rack for positively ejecting the egg shell therefrom, and means for operating said feeding, opening and ejecting means in timed relation.

29. In a machine of the type described, the combination of means for successively delivering eggs to a fixed point, other means for successively breaking eggs at said fixed point, other means for successively removing broken egg shells from said fixed point, and means for operating said delivering, opening and shell removing means in timed relation.

30. A machine of the class described having, in combination, a pair of spaced apart and independently mounted arm-supporting members, arms pivotally mounted on said arm-supporting members, cracking members carried by said arms, automatic means for simultaneously moving said arm-supporting members toward each other, means thereafter for swinging said arms toward and from each other, and means supported independently of the arm-supporting members for holding an egg in position to be struck by said cracking members.

31. A machine of the class described having, in combination, a pair of spaced apart and independently mounted arm-supporting members, arms pivotally mounted on said arm-supporting members, egg cracking members carried by said arms, automatic means for periodically moving said supporting members toward and away from each other, means for periodically swinging said arms about their pivots in synchronism with and following the inward movements of said supporting members to bring the cracking members into engagement with each other and an egg just prior to a separating movement of said supporting members, and means supported independently of the arm supporting members for holding an egg in a position to be struck by said cracking members as they swing together whereby ensuing separating movement of said supporting members separates said cracking members while the latter are engaged with the egg shell, to open the shell.

32. Apparatus as described in claim 31, with means for swinging said arms in reverse direction to disengage said cracking members from an egg shell following opening of the shell.

WILLIAM G. YOUNG.
MORTON HANSEN.
JOSEPH F. POLLON.